United States Patent [19]

Shirasaki

[11] Patent Number: 5,096,642

[45] Date of Patent: Mar. 17, 1992

[54] PROCESS FOR PRODUCING A HIGH DENSITY CERAMIC OF PEROVSKITE

[75] Inventor: Shin-ichi Shirasaki, Tsukuba, Japan

[73] Assignee: National Institute for Research In Inorganic Materials, Tsukuba, Japan

[21] Appl. No.: 133,427

[22] Filed: Dec. 15, 1987

[30] Foreign Application Priority Data

Dec. 19, 1986 [JP] Japan .................... 61-304966

[51] Int. Cl.$^5$ ............................. C04B 33/32
[52] U.S. Cl. ........................... 264/66; 264/61; 501/102; 501/103; 501/104; 501/105; 501/108; 501/112; 501/114; 501/117; 501/118; 501/119; 501/123; 501/125; 501/126; 501/127; 501/132; 501/134; 501/135; 501/136; 501/137; 501/138; 501/139
[58] Field of Search ............ 264/66, 61; 501/103, 501/102, 134, 135, 136, 137, 138, 139, 104, 105, 108, 112, 114, 117, 118, 119, 123, 125, 126, 127, 132; 252/62.9

[56] References Cited

U.S. PATENT DOCUMENTS

| | | | |
|---|---|---|---|
| 3,708,438 | 1/1973 | Levy | 501/102 |
| 4,019,915 | 4/1977 | Miyauchi | 501/135 |
| 4,065,544 | 12/1977 | Hamling | 264/56 |
| 4,211,758 | 7/1980 | Buhrer | 264/66 |
| 4,293,534 | 10/1981 | Arendt | 501/136 |
| 4,484,997 | 11/1984 | Secrist | 264/61 |
| 4,490,681 | 7/1990 | Ushida | 501/134 |
| 4,501,818 | 2/1985 | Rossi | 501/103 |
| 4,636,378 | 1/1987 | Pastor | 501/135 |
| 4,650,552 | 3/1987 | de Nova | 501/127 |
| 4,829,033 | 5/1989 | Menashi | 501/139 |
| 4,832,939 | 5/1989 | Megashi | 501/134 |
| 4,845,056 | 7/1989 | Yamanis | 501/103 |
| 4,853,199 | 8/1989 | Inoue | 501/135 |
| 4,859,448 | 8/1989 | Klee | 501/137 |
| 4,874,598 | 10/1989 | Oda | 501/134 |
| 4,887,186 | 12/1989 | Takeshi | 264/61 |
| 4,939,108 | 7/1990 | Dean | 501/137 |
| 4,946,810 | 8/1990 | Heistand | 264/63 |
| 4,948,767 | 8/1990 | Ushida | 501/134 |
| 4,959,089 | 9/1990 | Bhargava | 501/137 |
| 5,017,534 | 5/1991 | Chaput | 501/134 |
| 5,023,032 | 6/1991 | Bailey | 501/136 |

OTHER PUBLICATIONS

Sakka, Gel Method for Making, Glass, Treatise on Materials Science and Technology, vol. 22, 7/1982, pp. 158-160.

Primary Examiner—James Derrington
Attorney, Agent, or Firm—Oblon, Spivak, McClelland, Maier & Neustadt

[57] ABSTRACT

A process for producing a high density ceramic of perovskite represented by the formula:

$$ABO_3$$

wherein A is one or more metal elements coordinated with 12 oxygen atoms, and B is one or more metal elements coordinated with 6 oxygen atoms, which comprises:

(1) a step of a) preparing at least one single element solution (a solution of a modifiable element) containing the entire amount of one of the metal elements constituting the perovskite, and at least one single element solution (a solution of a modifying element) containing a part of the entire amount of another one of the metal elements constituting the perovskite, or b) preparing at least two solutions including at least one mixed solution obtained by mixing the above single element solutions at optional proportions;

a step of a) forming in a single vessel an intimate precipitate mixture from said at least two single element solutions or from said at least two solutions including at least one mixed solution, in at least two steps, or b) forming separately in separate vessels precipitates from said at least two single element solutions or from said at least two solutions including at least one mixed solution and mixing the precipitates to obtain an intimate precipitate mixture; and steps of washing, drying and calcining the intimate precipitate mixture at a temperature of from 400° to 1 400° C. to obtain a modified oxide powder;

(2) a step of mixing with the modified oxide powder a powder of a compound containing the rest of the entire amount of the modifying element and powders of compounds containing the entire amounts of metal elements constituting the peroveskite other than zirconium and the modifying element; and a step of calcining the powder mixture at a temperature of from 400° to 1400° C.; and (3) a step of compacting the calcined product; and a step of sintering the compacted product at a temperature of from 700° to 1700° C.

12 Claims, No Drawings

PROCESS FOR PRODUCING A HIGH DENSITY CERAMIC OF PEROVSKITE

BACKGROUND OF THE INVENTION

1. Field of the Invention

The present invention relates to a process for producing a high density ceramic of perovskite. Such a ceramic of perovskite is widely used in the field of functional ceramics such as piezo-electric elements, dielectrics, semiconductors, and optoelectronics materials.

2. Discussion of Background

Functional ceramics of perovskite are usually produced on an industrial scale by a so-called dry process wherein starting powder materials are mixed and calcined, and then the calcined powder mixture thus obtained is compacted and sintered. However, if the starting powder materials have no adequate powder characteristics, it is hardly possible to obtain a perovskite powder having excellent powder characteristics.

For instance, it is known that a starting zirconia powder is likely to coagulate, whereby it is difficult to obtain a perovskite powdered material having excellent powder characteristics i.e. a powder of a submicron level in a monodisperse state. When a perovskite powder were prepared from such a coagulated starting powdered material by the dry process, the average particle size of the perovskite powder would be at best about 2 $\mu$m, and thus, it would be hardly possible to obtain the functional ceramics having a high density and excellent functionality by sintering the perovskite powder.

On the other hand, a readily sinterable perovskite powder of a submicron level may be obtained by a wet process such as an alkoxide method or a coprecipitation method. However, the wet process has such drawbacks that the cost is high and it involves operations which are complicated as compared with the dry process.

SUMMARY OF THE INVENTION

It is an object of the present invention to overcome the drawbacks of the conventional dry process when starting powder materials having poor powder characteristics is used for the preparation of a ceramic of perovskite. Namely, it is an object of the present invention to provide a process for producing various functional ceramics of perovskite having a high density and excellent functionality by modifying, by a method of plural stages of precipitation, at least one starting powder material to a modified oxide powder of a submicron level having an excellent dispersability, adding to the modified oxide powder the rest of the starting powder materials by a simple dry process, calcining to obtain a perovskite powder of a submicron level having excellent sinterability and uniformity, and sintering the powder material of perovskite.

The present inventors have conducted extensive researches to attain the above object. As a result, they have found that in a process for producing a ceramic of perovskite represented by the formula:

$$ABO_3$$

wherein A is one or more metal elements coordinated with 12 oxygen atoms, and B is one or more metal elements coordinated with 6 oxygen atoms, a submicron level modified zirconia powder which hardly undergoes coagulation, can be obtained by preparing a solution containing the entire amount of zirconium (element B) required for the preparation of the perovskite (a solution of a modifiable element), and at least one single element solution (a solution of a modifying element) containing a part of the entire amount of one of the metal elements constituting the perovskite other than zirconium, or preparing at least two solutions including at least one mixed solution obtained by mixing the above single element solutions at optional proportions; contacting said at least two solutions with a precipitating solution in a single vessel in at least two steps to form an intimate precipitate mixture, or contacting said at least two solutions with a precipitating solution in separate vessels to form precipitates separately and mixing the separately prepared precipitates to obtain an intimate precipitate mixture; and washing, drying and calcining the intimate precipitate mixture at a temperature of from 400° to 1400° C. to obtain a modified zirconia powder.

To the modified zirconia powder as the starting material, a powder of a compound containing the rest of the entire amount of the modifying element and powders of compounds containing the entire amounts of metal elements constituting the perovskite other than zirconium and the modifying element are mixed by a dry process and calcined to obtain a perovskite powder having powder characteristics of a submicron level (i.e. ready sinterability and high packing density), and then, the perovskite powder is compacted and sintered, whereby a ceramic of perovskite having a high density and high performance can be readily obtained without using a sintering aid. The present invention has been accomplished on the basis of these discoveries.

The present invention provides a process for producing a high density ceramic of perovskite represented by the formula:

$$ABO_3$$

wherein A is one or more metal elements coordinated with 12 oxygen atoms, and B is one or more metal elements coordinated with 6 oxygen atoms, which comprises:

(1) a step of a) preparing at least one single element solution (a solution of a modifiable element) containing the entire amount of one of the metal elements constituting the perovskite, and at least one single element solution (a solution of a modifying element) containing a part of the entire amount of another one of the metal elements constituting the perovskite, or b) preparing at least two solutions including at least one mixed solution obtained by mixing the above single element solutions at optional proportions;

a step of a) forming in a single vessel an intimate precipitate mixture from said at least two single element solutions or from said at least two solutions including at least one mixed solution, in at least two steps, or b) forming separately in separate vessels precipitates from said at least two single element solutions or from said at least two solutions including at least one mixed solution and mixing the precipitates to obtain an intimate precipitate mixture; and steps of washing, drying and calcining the intimate precipitate mixture at a temperature of from 400° to 1400° C. to obtain a modified oxide powder;

(2) a step of mixing with the modified oxide powder a powder of a compound containing the rest of the entire amount of the modifying element and powders of compounds containing the entire amounts of metal elements constituting the perovskite other than the modifiable and modifying elements; and a step of calcining the powder mixture at a temperature of from 400° to 1400° C.; and (3) a step of compacting the calcined product; and a step of sintering the compacted product at a temperature of from 700° to 1700° C.

DETAILED DESCRIPTION OF THE PREFERRED EMBODIMENT

As the metal elements of component A in perovskite of the formula $ABO_3$ wherein A and B are as defined above, there may be mentioned, for instance, Pb, Ba, Ca, Sr and rare earth elements such as La and Y. As the metal element of component B, there may be mentioned, for instance, Ti, Zr, Mg, Sc, Hf, Th, W, Nb, Ta, Cr, Mo, Mn, Fe, Co, Ni, Cd, Al, Sn, As and Bi.

Further, perovskite according to the present invention includes non-stoichiometric perovskite wherein the molar ratio of componets A and B is disproportionated to a value higher or lower than 1.0.

Moreover, to improve the sinterability or performance of the perovskite functional ceramic, a small amount of a sintering aid may be incorporated. Such a sintering aid may be added in the form of a solution in the step (1) or in a dry form in the step (2) as the case powder requires.

As the compounds useful for the preparation of the aqueous or alcohol solutions of the constituting metal elements of components A and B of the perovskite, there may be mentioned sulfates, nitrates, chlorides, oxynitrates, oxychlorides, hydroxides, oxides, formates, oxalates, carbonates or metals of such elements. When they are not soluble in water or an alcohol, they may be made soluble by an addition of a mineral acid.

The step (1) is basically conducted by using an aqueous or alcohol solution, but an alkoxide solution can be used.

For the precipitating solution, organic reagents may be used such as amines, tetramethylammonium hydroxide and urea as well as ammonia, ammonium carbonate, sodium hydroxide, oxalic acid and ammonium oxalate. However, the precipitating solution is not restricted such examples. The precipitating solution used in the step (1) is not limited to one kind even in a single precipitating operation. Further, precipitates can be formed by a method other than the method of using the precipitating solution, for instance, by hydrolysis or spray decomposition.

In order to obtain the modified oxide powder, the kind and an amount of the modifying element are selected so that the coagulation of the modified oxide powder can thereby be suppressed. Further, it is preferred that the modifying element is an element which may be incorporated commonly in various kinds of perovskite functional ceramics. Thus, various perovskite powders can be prepared by a simple dry process using one modified powder.

The calcining temperature for preparing the modified oxide powder is preferably from 400° to 1400° C. If the calcining temperature is less than 400° C., the coagulation is likely to take place. On the other hand, if the temperature exceeds 1400° C., the powder tends to be coarse.

In the step (2), the modified oxide powder thus obtained, is mixed with a powder of a compound containing the rest of the entire amount of the modifying element and powders of compounds containing the entire amounts of metal elements constituting the perovskite other than the modifiable and modifying elements. The powders of compounds added and mixed are preferably commercially available submicron level powders. However, in the case of the powder of the compound of the component A, even if the powder is considerably coarse it does not adversely affect the characteristics of the resultant perovskite powder.

The calcining temperature for the powder mixture widely varies within the range of from 400° to 1400° C. depending on whether the mixture contains Pb, or Ba and Sr, or Nb and Ta. Namely, the powder mixture should be calcined within a temperature range of from the lowest temperature at which the solid phase reaction occurs in the powder mixture to the highest temperature at which no remarkable particle growth occurs. If the calcining temperature is less than 400° C., the solid phase reaction will be inadequate even in the case of perovskite containing Pb. On the other hand, if the temperature exceeds 1400° C., the powder tends to be coarse even in the case of perovskite containing Nb.

In the step (3), the calcined product thus obtained is compacted and sintered. The sintering temperature depends on the kinds of the metal elements constituting the perovskite, as in the case of the calcining temperature. The sintering temperature is generally from 700° to 1700° C. If the temperature is less than 700° C., the sintering will be inadequate even in the case of perovskite containing Pb. If the temperature exceeds 1700° C., the powder tends to be coarse or to evaporate even in the case of perovskite containing Nb.

Now, the present invention will be described in further detail with reference to Examples. However, it should be understood that the present invention is by no means restricted to these specific Examples.

EXAMPLE 1

43.57 cc of an aqueous titanium tetrachloride solution (concentration: 1.3317 l/mol) and 150 cc of an aqueous zirconium oxynitrate solution (concentration: 1.146 l/mol) were prepared. The aqueous titanium tetrachloride solution was gradually added to 1 liter of 6N aqueous ammonia under stirring to form precipitates of the hydroxide of $Ti^{4+}$. Then, the aqueous zirconium oxynitrate solution was added thereto under continuous stirring to form intimate precipitates of the hydroxides of $Ti^{4+}$ and $Zr^{4+}$. The precipitates were washed, dried and calcined at 1120° C. to obtain a powder having a composition of $(Ti_{0.2}Zr_{0.8})O_2$. The primary particles of this powder had an average particle size of 0.2 μm and were substantially in a monodisperse state.

3.5779 g of this powder, 1.4981 g of a commercially available fine $TiO_2$ powder and 11.16 g of a PbO powder (average particle size: 1.5 μm) were mixed and pulverized by a ball mill for one day and night, and the mixture was calcined at 740° C. for one hour to obtain a powder of $Pb(Zr_{0.5}Ti_{0.5})O_3$. The powder was monodisperse particles having an average particle size of 0.25 μm.

The perovskite powder thus obtained was compacted under a pressure of 1 t/cm$^2$ and sintered in an atmosphere of lead vapor and oxygen gas at 1220° C. for one hour. The sintered product had a density of 7.98, which is very close to the theoretical density, a permittivity of 7.90 and a tan δ of 0.5.

EXAMPLE 2

150 cc of an aqueous zirconium oxynitrate solution (concentration: 1.146 1/mol) and a solution having 17.357 g of a PbO powder dissolved in dilute nitric acid, were prepared. The aqueous zirconium oxynitrate solution was gradually added to 1 liter of 6N aqueous ammonia under stirring to form precipitates of the hydroxide of $Zr^{4+}$. Then, the solution having lead oxide dissolved in dilute nitric acid, was added thereto under continuous stirring to form intimate precipitates of the hydroxides of $Zr^{4+}$ and $Pb^{2+}$. The precipitates were washed, dried and calcined at 1050° C. to obtain a powder of mixed oxides having a composition of $0.2PbO.0.8ZrO_2$. The primary particles of this powder had an average particle size of 0.33 $\mu$m and were substantially in a monodisperse state.

3.0 g of this powder, 1.160 g of a commercially available fine $TiO_2$ powder and 8.422 g of a PbO powder were mixed and pulverized by a ball mill for one day and night and calcined at 740° C. for one hour to obtain a powder of $Pb(Zr_{0.5}Ti_{0.5})O_3$. This powder was monodisperse particles having an average particle size of 0.37 $\mu$m.

The powder thus obtained was compacted under a pressure of 1 t/cm² and sintered in an atmosphere of lead vapor and oxygen gas at 1220° C. for one hour. The sintered product had a density of 7.90, which is very close to the theoretical density.

COMPARATIVE EXAMPLE 1

Commercially available powders of PbO, $ZrO_2$ and $TiO_2$ were mixed to have a composition of $Pb(Zr_{0.5}Ti_{0.5})O_3$. The mixture was mixed and pulverized by a ball mill for one day and night, and calcined at 800° C. for two hours. The average particle size of the powder during calcining was 2.3 $\mu$m.

The powder thus obtained was compacted under a pressure of 1 t/cm² and sintered in the same condition as in Example 1. The ceramics thus obtained had a density of about 6.5, a permittivity of 7.30, and a tan $\delta$ of 1.0.

EXAMPLE 3

2.8639 g of the powder having a composition of $(Ti_{0.2}Zr_{0.8})O_2$ prepared in the same manner as in Example 1, 1.1985 g of a commercially available $TiO_2$ fine powder, 11.16 g of a commercially available $PbO_2$ powder, 0.8861 g of a commercially available $Nb_2O_5$ fine powder and 0.2675 g of a $Co_3O_4$ powder obtained by calcining cobalt hydroxide at 750° C. were mixed and pulverized by a ball mill for one day and night, and the mixture was calcined at 750° C. for one hour to obtain a perovskite powder having a composition of $0.2Pb(Co_{1/3}.Nb_{2/3})O_3$-$0.4PbTiO_3$-$0.4PbZrO_3$ for piezoelectric ceramics. Further, perovskite powders having a composition of $0.375Pb(Mg_{1/3}.Nb_{2/3})O_3$-$0.375PbTiO_3$-$0.25PbZrO_3$, a composition of $0.5Pb(Mg_{1/3}.Nb_{2/3})O_3$-$0.5PbZrO_3$, a composition of $0.2Pb(Zn_{1/3}.Nb_{2/3})O_3$-$0.4PbZrO_3$-$0.4PbTiO_3$ and a composition of $0.5Pb(Zn_{1/3}.Ta_{2/3})O_3$-$0.5PbZrO_3$ were prepared in the same manner as above. The primary particles of these powders had average particle sizes of about 0.29-0.35 $\mu$m and were all in a monodisperse state.

These powders were compacted under a pressure of 1 t/cm² and sintered in an atmosphere of lead vapor and oxygen gas at 1220° C. for one hour. The resultant sintered products had densities of 7.85-7.97, which were very close to the respective theoretical densities.

The $0.375Pb(Mg_{1/3}.Nb_{2/3})O_3$-$0.375PbTiO_3$-$0.25PbZrO_3$ ceramics had an electromechanical coupling factor Kr of 72% and a quality factor Qm of 92.0.

COMPARATIVE EXAMPLE 2

Commercially available powders of PbO, $Nb_2O_5$, $TiO_2$, $ZrO_2$ and CoO were weighed to have the same composition as in Example 3, and mixed and pulverized by a ball mill for one day and night. The mixture was sintered at 800° C. for two hours.

The powder thus obtained was compacted under pressure of 1 t/cm² and sintered in an atmosphere of lead vapor and oxygen gas at 1220° C. for one hour. The ceramics of composition $0.2Pb(Zn_{1/3}Nb_{2/3})O_3$-$0.4PbTiO_3$-$0.4PbZrO_3$ thus obtained had a density of about 7.0. The average size of primary particles of the calcined product could not be measured because they considerably coagulated. $0.375Pb(Mg_{1/2}.Nb_{2/3})O_3$-$0.375PbTiO_3$-$0.25PbZrO_3$ ceramics were also prepared in the same manner as above. The ceramics had a density of 7.60, Kr of 63% and Qm of 60.4.

EXAMPLE 4

A $(Ti_{0.2}Zr_{0.8})O_2$ powder prepared as in Example 1 was mixed with $TiO_2$, $La_2O_3$ and PbO powders in an appropriate proportion and calcined at 750° C. to obtain a powder of $Pb_{0.91}La_{0.09}(Ti_{0.35}Zr_{0.65})_{0.9775}O_3$. The particle size of the powder was 0.3 $\mu$m.

The powder thus obtained was compacted and then sintered in an atmosphere of lead vapor and oxygen gas under atmospheric pressure for 40 hours. The surface of the sintered product was polished. The degree of light transmission of the sintered product with a thickness of 0.5 mm was 68%, which is very close to the theoretical degree of light transmission.

COMPARATIVE EXAMPLE 3

Commercially available powders of PbO, $ZrO_2$, $TiO_2$ and $La_2O_3$ were mixed to have the same composition as in Example 4 and calcined at 800° C. to obtain a powder having a composition of $Pb_{0.91}La_{0.09}(Ti_{0.35}Zr_{0.65})_{0.9775}O_3$. The particle size of the powder was about 2 $\mu$m.

The powder thus obtained was sintered under the same condition as in Example 4, and polished. The degree of light transmission of the sintered product with a thickness of 0.53 mm was as low as about 31%.

EXAMPLE 5

A $(Ti_{0.2}Zr0.8)O_2$ powder prepared as in Example 1 was mixed with commercially available $TiO_2$ and $BaCO_3$ powders in an appropriate proportion, and then calcined at 1050° C. to obtain a powder of $Ba(Zr_{0.938}Ti_{0.062})O_3$ for dielectric ceramics. The particle size of the powder was 0.30 $\mu$m.

The powder was compacted and sintered for 6 hours at 1550° C. The sintered product had a density of 5.31, which is very close to the theoretical density.

COMPARATIVE EXAMPLE 4

Commercially available $TiO_2$, $BaCO_3$ and $ZrO_2$ powders were mixed to have the same composition as in Example 5 and calcined at 1050° C. to obtain a powder of $Ba(Zr_{0.938}Ti_{0.062})O_3$. The particle size of the powder was 1.5 $\mu$m.

The powder thus obtained was subjected to sintering but the powder was hardly sintered.

EXAMPLE 6

10.67 cc of an aqueous magnesium nitrate solution (concentration: 1.100 l/mol) and 100 cc of an aqueous zirconium oxynitrate solution (concentration 1.146 l/mol) were prepared. The aqueous magnesium nitrate solution was gradually added to 1 liter of a 30% diethylamine aqueous solution under stirring to form precipitates of the hydroxide of $Mg^{2+}$. Then, an excess amount of the aqueous zirconium oxynitrate solution was added thereto under continuous stirring to form intimate precipitates of the hydroxides of $Mg^{2+}$ and $Zr^{4+}$. The precipitates were washed, dried and calcined at 1100° C. to obtain a powder having a composition of $0.1MgO.0.9.ZrO_2$. The primary particles of this powder had an average particle size of 0.23 μm and were substantially in a monodisperse state.

The powder thus obtained and powders of MgO, $TiO_2$, PbO and $Nb_2O_3$ were weighed to have the same composition as in $0.375Pb(Mg_{1/3}Nb_{2/3})O_3-0.375PbTiO_3-0.25PbZrO_3$ prepared in Example 3, and mixed. The mixture was calcined at 740° C. for 2 hours. The powder was compacted and sintered in an atmosphere of lead vapor and oxygen gas at 1220° C. for 1 hour. The ceramics thus obtained had a density of about 7.89, which is very close to the theoretical density.

Zirconia powder was modified in the same manner as above by using zinc nitrate, iron nitrate or cobalt nitrate instead of magnesium nitrade to obtain a powder having a composition of $0.1ZnO.0.9ZrO_2$, $0.1FeO_{3/2}.0.9ZrO_2$ or $0.1CoO.0.9ZrO_2$, and calcined. The particle size of each powder was essentially the same as that of $0.1MgO.0.9ZrO_2$.

The same results as above were obtained to a modified zirconia powder of $0.1BaCO_3.0.9ZrO_2$ or $0.1BaCO_3.0.9ZrO_2$ which was prepared in the same manner as above by using barium nitrate or strontium nitrate instead of magnesium nitrate and by using ammonium carbonate as the precipitating solution instead of diethylamine.

According to the process of the present invention, the modified oxide powder containing at least two metal elements constituting the perovskite (e.g. zirconium powder modified by titanium) obtained in the step (1) is a submicron level uniform particle in a monodisperse state. It is emphasized that the precipitates are formed in plural stages, whereby it is possible to obtain precipitates wherein two or more phases are highly dispersed in one another. As the result, the precipitates hardly undergo coagulation during the drying or calcining process, whereby it is possible to obtain a readily sinterable perovskite powder of a submicron size by a simple dry process.

Heretofore, a powder having about 2 μm at best can be obtained by the dry process. Thus, it is epochal to provide a powder of a submicron level only by the dry process. The present invention further provides the highly functional ceramics having a high density very close to the theoretical density by compacting and sintering such a submicron monodispersed perovskite powder.

Further, the following excellent effects are obtainable.

1) Even if the modified oxide powder obtained by the calcination may slightly coagulate, the coagulation force is so weak that the powder readily becomes in a monodisperse state in the mixing and pulverizing step using a ball mill. Accordingly, the modified oxide powder can be made a marketable product simply by calcination, whereby the perovskite powder can be obtaiend at a low cost.

2) The perovskite powder obtained by the calcination according to the process of the present invention is in a monodisperse state, whereby it is possible to obtain a readily sinterable powder without the pulverizing step.

3) In the field of the perovskite functional ceramics which are required to have a high density and excellent characteristics, it is possible to obtain ceramics having a density which is very close to the theoretical density by simple sintering under the normal pressure without HIP or hot press.

4) By mass-producing the monodispersed modified oxide powder having excellent powder characteristics and subsequently conducting the same steps as in the conventional dry process, a number of perovskite powders containing the modifying and modifiable elements in common, having excellent characteristics and perovskite functional ceramics having excellent functionality, can be provided at a low cost.

5) The modified oxide powder obtained in the step (1) of the present invention has adequate uniformity, and the perovskite powder obtained by mixing and calcining in the subsequent dry process has adequate uniformity which is nearly equal to that of the powder obtained by a conventional coprecipitation or alkoxide method.

What is claimed is:

1. A process for producing a high density ceramic of perovskite having the formula:

$$ABO_3$$

wherein A is one or more metal elements coordinated with 12 oxygen atoms, and B is one or more metal elements coordinated with 6 oxygen atoms, which comprises:
 (a) preparing at least one single element solution of a modifiable element containing the entire amount of one of the metal elements constituting the perovskite, and at least one single element solution of a modifying element containing a part of the entire amount of another one of the metal elements constituting the perovskite;
 (b) forming in a single vessel an intimate precipitate mixture by plural steps of precipitation from said single element solution or solutions;
 (c) washing, drying and calcining the intimate precipitate mixture at a temperature of from 400° C. to 1400° C. to obtain a modified oxide powder having primary particles in a substantially monodispersed state;
 (d) mixing with the modified oxide powder a powder of a compound containing the rest of the entire amount of modifying element and powders of compounds containing the entire amounts of metal elements constituting the perovskite other than the modifiable and modifying elements;
 (e) calcining the powder mixture at a temperature of from 400° C. to 1400° C.; and
 (f) compacting the calcined produce, and sintering the compacted product at a temperature of from 700° C. to 1700° C.

2. The process according to claim 1, wherein the precipitate is formed by contacting the single element solution with a precipitating solution.

3. The process according to claim 2, wherein the precipitating solution is selected from the group consisting of solutions of ammonia, ammonium carbonate, sodium hydroxide, oxalic acid, ammonium oxalate and organic amines.

4. The process according to claim 1, wherein A is selected from the group consisting of Pb, Ba, Ca, Sr, La and Y; and B is selected from the group consisting of Zr, Ti, Mg, Sc, Hf, Th, W, Nb, Ta, Cr, Mo, Mn, Fe, Co, Ni, Cd, Al, Sn, As and Bi.

5. The process according to claim 1, wherein the modifiable element is Zr, and the modifying element is selected from the group consisting of Ti, Pb, La, Mg, Co, Fe, Zn, Ba, Sr and Ca; and the rest of the constituting elements are selected from the group consisting of La, Ti, Pb, Co, Nb, Fe, Mg, Zn, Ta, Ba, Sr and Ca.

6. A process for producing a high density ceramic of perovskite having the formula:

$$ABO_3$$

wherein A is selected from the group consisting of Pb, Ba, Ca, Sr and La; and B is selected from the group consisting of Ti, Zr, Co, Nb, Ta, Fe, Zn and Mg; which comprises:

(a) preparing a modifiable element solution containing the entire amount of zirconium required for the perovskite, and at least one single modifying element solution containing a part of the entire amount of one of the metal elements constituting the perovskite other than zirconium;

(b) contacting said modifiable element solution and said modifying element solution with a precipitating solution in at least two steps to form an intimate precipitate mixture;

(c) washing, drying and calcining the intimate precipitate mixture at a temperature of from 400° C. to 1400° C. to obtain a modified zirconia powder;

(d) mixing with the modified zirconia powder a power of a compound containing the rest of the entire amount of the modifying element and powders of compounds containing the entire amounts of metal elements constituting the perovskite other than zirconium and the modifying element;

(e) calcining the powder mixture at a temperature of from 400° C. to 1400° C.; and (f) compacting the calcined product; and sintering the compacted product at a temperature of from 700° C. to 1700° C.

7. A process for producing a high density ceramic of perovskite having the formula:

$$ABO_3$$

wherein A is one or more metal elements coordinated with 12 oxygen atoms, B is one or more metal elements coordinated with 6 oxygen atoms, which comprises:

(a) preparing at least two solutions including at least one mixed solution obtained by mixing, in optional proportions, at least one single element solution of a modifiable element containing the entire amount of one of the metal elements constituting the perovskite, and at least one single element solution of a modified element containing a part of the entire amount of another one of the metal elements constituting the perovskite;

(b) forming separately in separate vessels precipitates from said at least two single element solutions or from said at least two solutions including at least one mixed solution and mixing the precipitates to obtain an intimate precipitate mixture;

(c) washing, drying and calcining the intimate precipitate mixture at a temperature of from 400° C. to 1400° C. to obtain a modified oxide powder having primary particles in a substantially monodispersed state;

(d) mixing with the modified oxide powder a powder of a compound containing the rest of the entire amount of the modifying element and powders and compounds containing the entire amounts of metal elements constituting the perovskite other than the modifiable and modifying elements;

(e) calcining the powder mixture at a temperature of from 400° C. to 1400° C.; and (f) compacting the calcined products, and sintering the compacted product at a temperature of from 700° C. to 1700° C.

8. The process according to claim 7, wherein the precipitates are formed by contacting said at least two solutions with precipitating solution.

9. The process according to claim 8, wherein the precipitating solutions are selected from the group consisting of solutions of ammonia, ammonium carbonate, sodium hydroxide, oxalic acid, ammonium oxalate and organic amines.

10. The process according to claim 7, wherein each solution is an aqueous or alcohol solution.

11. The process according to claim 7, wherein A selected from the group consisting of Pb, Ba, Ca Sr, La and Y; and B is selected from the group consisting of Zr, Ti, Mg, Sc, Hf, Th, W, Nb, Ta, Cr, Mo, Mn, Fe, Co, Ni, Cd, Al, Sn, As and Bi.

12. The process according to claim 7, wherein the modifiable element is Zr, the modifying element is selected from the group consisting of Ti, Pb, La, Mg, Cr, Fe, Zn, Ba, Sr and Ca; and the rest of the constituting elements are selected from the group consisting of La, Tr, Pb, Co, Nb, Fe, Mg, Zn, Ta, Ba, Sr and Ca.

* * * * *